July 31, 1962 F. G. F. BEHLES 3,047,100
BRAKE SHOE CONSTRUCTION
Filed Oct. 6, 1959
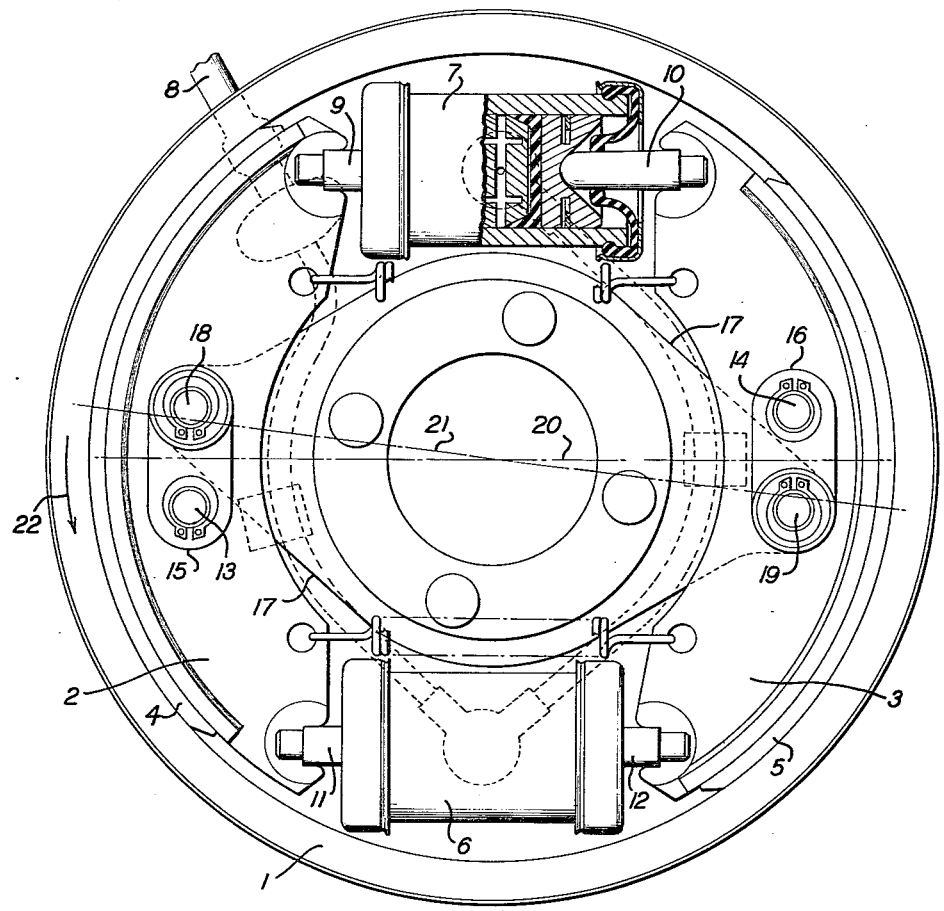
INVENTOR
FRANZ G. F. BEHLES

3,047,100
BRAKE SHOE CONSTRUCTION
Franz G. F. Behles, Stuttgart-Schoenberg, Germany, assignor to Daimler-Benz Aktiengesellschaft, Stuttgart-Unterturkheim, Germany
Filed Oct. 6, 1959, Ser. No. 845,059
Claims priority, application Germany Oct. 11, 1958
7 Claims. (Cl. 188—78)

The present invention relates to a parallel-type shoe-brake construction, especially of the type provided with pivotal or rotatable brake shoes, and preferably to a hydraulically-actuated motor vehicle shoe-brake construction.

With parallel-type shoe brakes, the resulting circumferential force of each brake shoe which has to be thought of as acting outside the radius of the drum, i.e., the resultant of all frictional forces between the brake lining and the brake surface at the brake drum which has to be thought of as being located outside the drum circumference, cannot be braced or absorbed in the line of application thereof but only at a smaller distance from the rotary axis of the drum than the distance corresponding to the radius of the drum. As a result thereof, a tilting moment is produced which seeks to apply the leading end of the brake shoe relatively more strongly and the trailing end of the brake shoe relatively less strongly, i.e., relatively more weakly. This, in turn, however, leads to uneven wear of the brake shoe lining.

With a known construction of the prior art, an equalization of the forces acting on the brake shoe is produced by a stepped cylinder construction. The stepped cylinder constructions are installed in these known prior art arrangements in such a manner that they exhibit on the side of the relatively smaller brake shoe abutment force a relatively larger cross-sectional area. Consequently, a relatively larger force is exerted on the piston having the larger cross-sectional area by the pressure oil conducted from the pressure cylinder. However, such an arrangement for equalizing the circumferential force and for equalizing the tilting moment is also relatively expensive. Furthermore, such a prior art equalization arrangement also requires a different construction for the brakes of the left and right side of the vehicle. Additionally, the stepped cylinder has to be supported sturdily since the support or mounting of the stepped cylinder has to absorb the difference in the forces between the oppositely disposed pistons provided with different cross-sectional areas.

Another construction is known in the prior art in which the brake shoe is not pivotally or rotatably supported and in which the hydraulic actuation of the individual brake shoes takes place by means of cylinders having identical diameters. In this last-mentioned arrangement, the brake shoes are secured by means of two pairs of shackles in a parallel guide arrangement. However, this last-mentioned prior art arrangement requires a high rigidity and sturdiness and high accuracy of installation in order to achieve as good and even an abutment of the brake shoe linings as possible. Furthermore, with this last-mentioned prior art construction, relatively high undesirable forces occur in the securing shackles of the brake shoes.

In order to obviate the aforementioned shortcomings and disadvantages, it is proposed in accordance with the present invention to arrange the brake-shoe linings in such a manner that the center line of each brake lining forming a radial line subtends an angle with the line extending parallelly to the brake cylinders through the center point of the brake. In particular, the center line of the brake lining forming the radial line and the line parallel to the brake cylinders and passing through the center point of the brake is to subtend an angle of approximately 5° to 10°.

It is possible by the use of a shoe brake construction in accordance with the present invention to construct the wheel brake cylinders as cylinders having the same diameter over the entire length thereof. The brake support arrangement may thereby be constructed of relatively light weight and in a simple manner. Additionally, separate equalization arrangements for equalizing the tilting moment are not necessary.

Accordingly, it is an object of the present invention to provide a shoe brake construction, especially for motor vehicles, which obviates the disadvantages of the prior art constructions.

It is another object of the present invention to provide a brake shoe arrangement for a wheel brake which is simple in construction, relatively inexpensive in manufacture and installation, and which also effectively compensates any existing difference in the forces acting on the brake shoes and more particularly on the linings thereof.

Another object of the present invention is the provision of a brake shoe construction, especially for the wheels of motor vehicles which assures an even abutment and therewith even wear over the entire circumference of the brake shoe linings.

Still a further object of the present invention is the provision of a brake shoe arrangement for the wheels of a vehicle which effectively eliminates the existence of any tilting moments produced by any possible difference in the forces acting circumferentially on the brake shoe linings.

A further object of the present invention resides in the provision of a shoe brake construction for vehicles in which the actuating parts of the hydraulic actuating system are identical irrespective of the side of the vehicle on which they are mounted.

These and further objects, features and advantages of the present invention will become more obvious from the following description when taken in connection with the accompanying drawing which shows, in the single FIGURE thereof, an elevational view, partly in cross-section, of a shoe brake construction in accordance with the present invention, the view being taken in the axial direction of the shoe brake arrangement.

Referring now more particularly to the drawing, reference numeral 1 designates therein the brake which normally houses on the inside thereof the essential, individual parts of the shoe brake. The two brake shoes are designated in the single figure by reference numerals 2 and 3, respectively. The brake shoes 2 and 3 are provided along the outer periphery thereof with brake linings 4 and 5 which may be secured thereto in any suitable manner, for example, by riveting or preferably by bonding or cementing. The cylinders 6 and 7 of the hydraulic actuating mechanism are disposed between the two brake shoes 2 and 3. The cylinders 6 and 7 are thereby provided with the same diameter at the inside over the entire operating length thereof. The actuating cylinders 6 and 7 are connected with each other by means of a hydraulic pressure line 8 which also interconnects the actuating cylinders 6 and 7 with the other elements of the hydraulic brake actuating system. Each cylinder 6 and 7 is provided within the interior thereof with a pair of oppositely disposed pistons of which only the piston rods 9, 10, 11 and 12 are visible in the single figure of the drawing. The piston rods 9, 10, 11 and 12 engage into corresponding recesses provided in the brake shoes 2 and 3 for purposes of actuating the same.

The two brake shoes 2 and 3 are suspended in the points 13 and 14 by means of shackle pairs 15 and 16 from a double-armed member 17 constructed as a plate-like member. The suspension of the two pairs of shackles 15 and 16 takes place at the outwardly disposed points 18 and 19 of the double-armed member 17.

As clearly shown in the drawing, a line 20 parallel to the axis of the wheel brake cylinders 6 and 7 passes through the center point of the brake. The common center line for the two brake linings is designated by reference numeral 21. The two lines 20 and 21 subtend therebetween an angle which in the illustrated embodiment is approximately 6°. The two brake linings 4 and 5 of the two brake shoes 2 and 3, therefore, are not disposed in the center of the arc forming the circumference of the respective brake shoe.

Furthermore, it is quite clearly visible from the drawing that the pivotal connection of the two brake shoes 2 and 3 does not take place in the center thereof, i.e., along the center line thereof. As illustrated in the drawing, the pivot point 13 of the brake shoe 2 is disposed below the parallel line 20 extending in parallel to the brake cylinders 6 and 7. On the other hand, the pivot point 14 of the brake shoe 3 is disposed above this parallel line 20.

After actuation of the brake pedal or the like of the motor vehicle, pressure oil is supplied in the illustrated embodiment over the pressure line 8 to the two actuating cylinders 6 and 7. As a result thereof, the four piston rods 9, 10, 11 and 12 move outwardly thereupon and force the two brake shoes 2 and 3 through the brake linings 4 and 5 thereof against the inside of the brake drum 1. It is assumed in connection with the illustrated embodiment that the brake drum rotates in the direction of the arrow 22. Consequently, a circumferential force is imparted to the two brake shoes 2 and 3 which corresponds to the direction of rotation of the arrow 22. It is achieved by the use of the particular suspension of the two brake shoes 2 and 3 in accordance with the present invention by means of shackle pairs 15 and 16 and by the particular arrangement of the brake shoe linings 4 and 5 on the brake shoes 2 and 3 that only the circumferential force is absorbed at the shackles and the brake shoe linings 4 and 5 are evenly worn.

While I have shown and described one embodiment in accordance with the present invention it is understood that the same is not limited thereto but is susceptible of many changes and modifications within the spirit and scope of the present invention and I, therefore, do not wish to be limited to the details described and illustrated herein but intend to cover all such changes and modifications as are encompassed by the scope of the appended claims.

I claim:

1. A brake shoe construction provided with an outer rotatable brake drum and with rotatable brake shoes comprising a pair of brake shoes each having a brake lining along the outer circumference thereof adapted to engage said brake drum to produce a braking effect, a pair of brake cylinders with actuating means for said brake-shoes, the center line of each brake lining forming a radial line thereof subtending an angle with a line essentially parallel to said brake cylinders and passing through the center point of the brake, a plate-like, double-armed member and a pair of shackle means for supporting one of said brake shoes at each of the arms of said double-armed member, said double-armed member and said means supporting said brake shoes being so constructed and arranged that the center line of each of said brake linings is located, with respect to the direction of rotation of said brake drum, rearwardly of said line parallel to said brake cylinders.

2. A brake shoe construction according to claim 1 wherein said cylinders have essentially the same diametric dimension over the entire length of the sliding surfaces thereof traversed by the pistons disposed therein.

3. A parallel brake shoe construction provided with an outer rotatable brake drum and with rotatable brake shoes of a hydraulically actuated motor vehicle brake system, comprising a pair of brake shoes each having a brake lining along the outer circumference thereof adapted to engage said brake drum to produce thereby a braking effect, a pair of brake cylinders, two oppositely disposed pistons of essentially the same cross-sectional area in each cylinder for engagement with respective ends of the brake shoes, the center line of each brake lining which constitutes a radial line thereof subtending an angle of approximately 5° to 10° with a line parallel to said cylinders and passing through the center point of the brake, a plate-like, double-armed member and a pair of shackle means for supporting one of said brake shoes at each of the arms of said double-armed member, said double-armed member and said means supporting said brake shoes being so constructed and arranged that the center line of each of said brake linings is located, with respect to the direction of rotation of said brake drum, rearwardly of said line parallel to said brake cylinders.

4. A parallel brake shoe construction provided with a brake support member, with an outer rotatable brake drum and with rotatable brake shoes of a hydraulically actuated brake system, comprising a pair of brake shoes each having a brake lining along the outer circumference thereof, a pair of brake cylinders each provided with two pistons having the same effective cross-sectional area for actuating said brake shoes, the center line of each brake lining forming a radial line thereof subtending an angle with the line essentially parallel to said brake cylinders and passing through the center point of the brake, and means for rotatably supporting said brake shoes on said support member for absorbing at said last-mentioned means only the circumferential forces acting on said brake linings to thereby assure completely even wear thereof, said rotatably supporting means including connecting means pivotally secured to a respective one of said brake shoes on a diametric dimension through said center point at an angle with said parallel line and pivotally connected to said support member on a diametric line passing through said center point at an angle with said parallel line on the side thereof opposite said first-mentioned diametric line, the connection of each said brake shoe with said connecting means being located forwardly, with respect to the direction of rotation of said brake drum, of said line extending essentially parallel to said brake cylinders.

5. A brake shoe construction provided with rotatable brake shoes comprising a rotatable brake drum, a pair of brake shoes each having a brake lining along the outer circumference thereof adapted to engage said brake drum to produce thereby a braking effect, a pair of brake cylinders, two oppositely-disposed pistons in each of said cylinders so constructed and arranged as to engage with respective ends of said brake shoes and to actuate the same, the center line of each brake lining which constitutes a radial line thereof subtending an angle with a line essentially parallel to said brake cylinders and passing through the center point of the brake, and means for supporting said brake shoes including an anchor plate and shackle means for supporting said brake shoes from said anchor plate, said shackle means extending substantially perpendicular to the actuating movement of said brake shoes, said anchor plate and shackle means being so constructed and arranged that the point of suspension of each said brake shoe at said shackle means is arranged on the side of said line parallel to said brake cylinders opposite to the point of suspension of the said shackle means at said anchor plate, and the center line of each of said brake linings is located rearwardly, with respect to the direction of rotation of said brake drum, of said line parallel to said brake cylinders.

6. A parallel brake shoe construction as defined in claim 5, wherein said anchor plate has two radially-extending oppositely-disposed arms, and wherein one of said brake shoes is supported on each of said arms by a shackle means.

7. A parallel brake shoe construction as defined in claim 6, wherein said brake cylinders have essentially the same diametric dimension over the entire length of the sliding surfaces thereof traversed by said pistons disposed therein.

References Cited in the file of this patent

UNITED STATES PATENTS

| | | |
|---|---|---|
| 2,197,452 | Fussell | Apr. 16, 1940 |
| 2,516,995 | House | Aug. 1, 1950 |

FOREIGN PATENTS

| | | |
|---|---|---|
| 671,324 | Great Britain | Apr. 30, 1952 |